United States Patent [19]
Baijan

[11] Patent Number: 5,887,963
[45] Date of Patent: Mar. 30, 1999

[54] PHOTOGRAPHY LIGHTING APPARATUS

[76] Inventor: Johnny B. Baijan, 24 S. Addison, Bensenville, Ill. 60106

[21] Appl. No.: 865,321

[22] Filed: May 29, 1997

[51] Int. Cl.[6] ............................. G03B 15/02; F21V 7/14
[52] U.S. Cl. ............................. 362/11; 362/16; 362/219; 362/225; 362/247; 362/304
[58] Field of Search ................................ 362/11, 16, 17, 362/216, 219, 225, 241, 247, 302, 304

[56] References Cited

U.S. PATENT DOCUMENTS

| | | | |
|---|---|---|---|
| 1,416,434 | 5/1922 | Allen | 362/247 |
| 1,558,570 | 10/1925 | Adams | 362/247 |
| 1,950,445 | 3/1934 | Braselton | 362/216 |
| 2,538,681 | 1/1951 | Gangbin | 362/216 |
| 4,866,478 | 9/1989 | Kasahara et al. | 362/11 |
| 5,436,815 | 7/1995 | Grooms et al. | 362/216 |

FOREIGN PATENT DOCUMENTS

| | | | |
|---|---|---|---|
| 772624 | 4/1957 | United Kingdom | 362/247 |

*Primary Examiner*—Alan Cariaso
*Attorney, Agent, or Firm*—Douglas B. White

[57] ABSTRACT

This lighting apparatus consists of an elongated double bulb mounted to a flash unit and extending through two reflector devices. The first of these reflectors is conical and upwardly directed and the second of these reflectors is curved and forwardly directed. The extended bulb comprises a pair of short bulbs joined by a connector forming an electrical and mechanical connection.

6 Claims, 3 Drawing Sheets

PHOTOGRAPHY LIGHTING APPARATUS

BACKGROUND OF THE INVENTION

1. Field of the Invention

This invention relates to lighting for photography, such as a photo flash. More particularly, this invention relates to improvements in the control of the direction and the intensity of light from flash units.

2. Description of the Prior Art

Prior flash units for photography have presented limited means for controlling the direction or intensity of the light. Conical reflectors with bulbs are unidirectional and require additional lighting to be effective and to eliminate shadows. Popular electronic flashes present the same problem, and while some provide limited diffusion, they do not adequately illuminate the photographed object.

SUMMARY OF THE INVENTION

Accordingly, it is the objective of the present invention to provide apparatus which produces better lighting through the use of increased intensity and bi-directional reflection.

This and other objects are accomplished by the use of an elongated double intensity bulb mounted to a flash unit and extending through two reflector devices. The first of these reflectors presents a conical upwardly directing device and the second of these reflectors presents a curved forwardly directing device. In a further feature, the extended bulb comprises a pair of short bulbs joined by a connector forming an electrical and mechanical connection.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Figure 1:
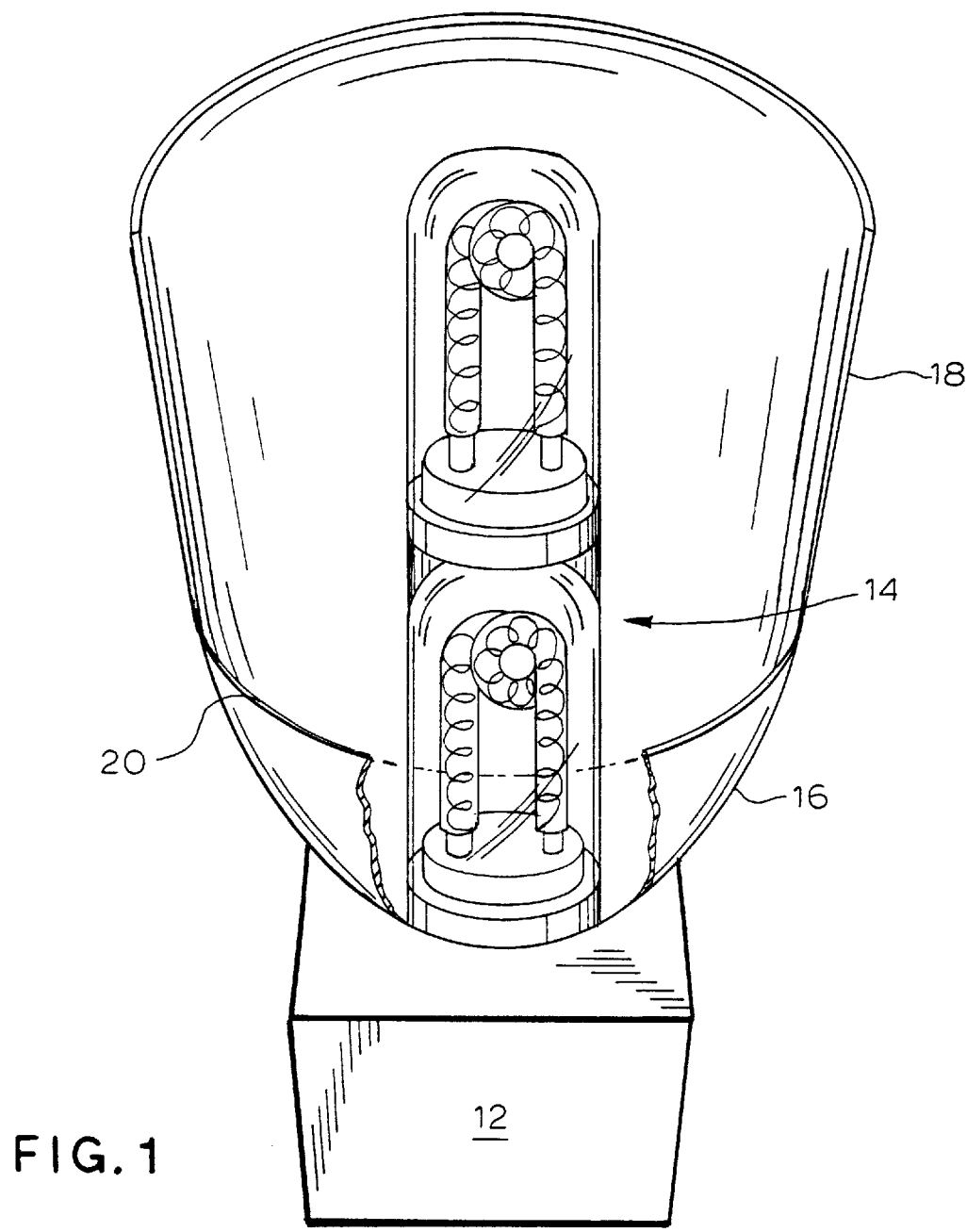
FIG. 1 is a frontal perspective view of a flash unit equipped with lighting apparatus in accordance with the present invention.
Figure 3:
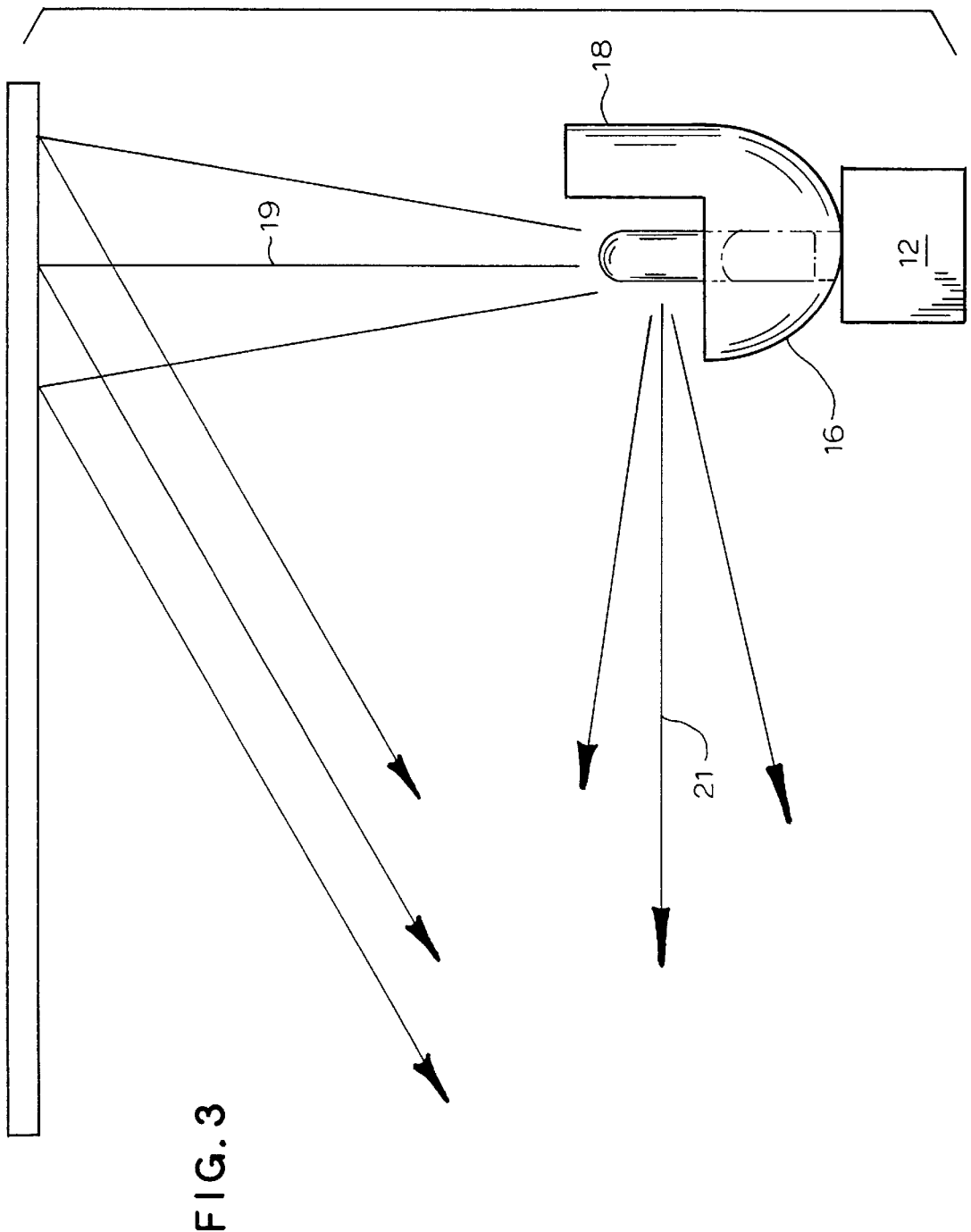
FIG. 3 is an illustration of the lighting effect achieved with the apparatus of FIG. 1.

Turning first to FIG. 1 there is shown a photography lighting apparatus having a power source 12 for synchronous operation with a camera, in accordance with methods well known in the art. An extended bulb 14 is mounted for electrical activation from the power source and extends upwardly through dual reflectors 16 and 18. The first of these reflectors, reflector 16, is conical in shape and directs light 19 upwardly, as shown in FIG. 3. In the preferred embodiment, the uppermost edge 20 of this first reflector presents a circular shape. The second of these reflectors, reflector 18, is generally curved to forwardly direct light 21, as shown in FIG. 3. In the preferred embodiment, this curvature of the second reflector 18 coincides with the radius of the uppermost edge 20 of the first reflector.

Figure 2:
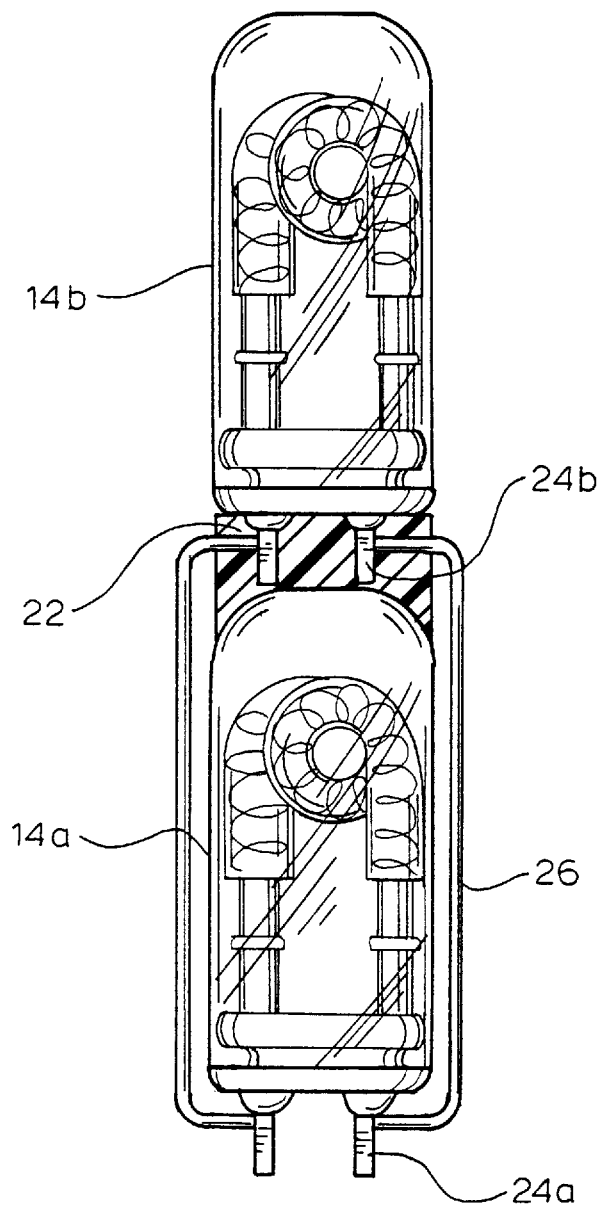
FIG. 2 is a front view of a double bulb unit employed in the preferred embodiment of the present invention.

The extended bulb 14 (FIG. 2) of this apparatus is preferably a double bulb arrangement, composed of two commonly available flash bulbs 14a and 14b joined by a connector 22. This connector conforms and adheres to the upper extremity of the lower bulb and accepts the contact pins 24b of the upper bulb. Electrically conductive straps 26 electrically connect the upper and lower pins in parallel for simultaneous activation.

As depicted in FIG. 3, electrical activation of this apparatus generates both a forwardly directed illumination 21 as well as a vertically directed bounce illumination 19. Moreover, in addition to the forwardly directed illumination shown, the forwardly directed light may also be bounced by walls or reflecting surfaces to illuminate the subject.

From the foregoing description, it will be apparent that modifications can be made to the apparatus and method for using same without departing from the teachings of the present invention. Accordingly, the scope of the invention is only to be limited as necessitated by the accompanying claims.

What is claimed is:

1. A photography lighting apparatus comprising:
   a power source;
   a bi-directional reflector comprising
      a first reflector member for directing light upwardly, wherein said first reflector member is conical in shape with an uppermost edge exhibiting a substantially circular shape, and
      a second reflector member arranged above said first reflector member for directing light forwardly; and
   an elongated bulb having electrical contacts connected to said power source, said bulb extending within both first and second reflector members for providing a simultaneous light source for both said reflector members.

2. The photography lighting apparatus of claim 1 wherein said second reflector is curved at substantially the same radius as the uppermost edge of said first reflector member.

3. A photography lighting apparatus comprising:
   a power source;
   a bi-directional reflector having a first reflector member for directing light upwardly and a second reflector member arranged above said first reflector member for directing light forwardly; and
   an elongated bulb having electrical contacts connected to said power source, said bulb extending within both first and second reflector members for providing a simultaneous light source for both said reflector members, wherein said elongated bulb comprises first and second bulbs, each of said respective first and second bulbs having electrical contacts defined thereon, and further comprising coupling means for electrically and mechanically joining said first and second bulbs.

4. The photography lighting apparatus of claim 2 wherein said elongated bulb comprises first and second bulbs, each having electrical contacts defined thereon, and further comprising coupling means for electrically and mechanically joining said bulbs.

5. The photography lighting apparatus of claim 3 wherein said coupling means comprises a connector member arranged to accept said electrical contacts of said first bulb and arranged to mechanically grip said second bulb, and further comprising electrically conductive straps for electrically connecting said electrical contacts of said first bulb to said electrical contacts of said second bulb.

6. The photography lighting apparatus of claim 4 wherein said coupling means comprises a connector member arranged to accept said electrical contacts of said first bulb and arranged to mechanically grip said second bulb, and further comprising electrically conductive straps for electrically connecting said electrical contacts of said first bulb to said electrical contacts of said second bulb.

\* \* \* \* \*